March 13, 1956  J. F. THULL  2,737,862
CARDBOARD TUBE FORMER AND WRAPPER

Filed May 2, 1950  11 Sheets-Sheet 1

Inventor
JOHN F. THULL

By *Howard F. Pincher*

Attorney

March 13, 1956  J. F. THULL  2,737,862
CARDBOARD TUBE FORMER AND WRAPPER
Filed May 2, 1950  11 Sheets-Sheet 2

Inventor
JOHN F. THULL
Attorney

March 13, 1956  J. F. THULL  2,737,862
CARDBOARD TUBE FORMER AND WRAPPER
Filed May 2, 1950  11 Sheets-Sheet 4

Inventor
JOHN F. THULL
By Howard Fischer
Attorney

March 13, 1956 J. F. THULL 2,737,862
CARDBOARD TUBE FORMER AND WRAPPER
Filed May 2, 1950 11 Sheets-Sheet 5

Inventor
JOHN F. THULL

By
Attorney

March 13, 1956　　　J. F. THULL　　　2,737,862
CARDBOARD TUBE FORMER AND WRAPPER
Filed May 2, 1950　　　　　　　　　　11 Sheets-Sheet 6

Inventor
JOHN F. THULL
By
Attorney

March 13, 1956 J. F. THULL 2,737,862
CARDBOARD TUBE FORMER AND WRAPPER
Filed May 2, 1950 11 Sheets-Sheet 7

Inventor
JOHN F. THULL
By
Attorney

March 13, 1956 J. F. THULL 2,737,862
CARDBOARD TUBE FORMER AND WRAPPER
Filed May 2, 1950 11 Sheets-Sheet 8

Inventor
JOHN F. THULL

By Thomas L. Pincher
Attorney

Inventor
JOHN F. THULL

Inventor
JOHN F. THULL

March 13, 1956 J. F. THULL 2,737,862
CARDBOARD TUBE FORMER AND WRAPPER
Filed May 2, 1950 11 Sheets-Sheet 11

Inventor
JOHN F. THULL

Attorney

United States Patent Office 2,737,862
Patented Mar. 13, 1956

2,737,862
CARDBOARD TUBE FORMER AND WRAPPER

John F. Thull, St. Paul, Minn., assignor to Brown & Bigelow, St. Paul, Minn., a corporation of Minnesota Application May 2, 1950, Serial No. 159,633

7 Claims. (Cl. 93—40.1)

This invention relates to a cardboard tube former and wrapper adapted to form a cardboard sheet into a rectangular form and wrap the tube with a covering sheet with the ends of the wrapping tucked into the ends of the tube.

The cardboard tube former is designed to receive a series of cardboard sheets in flat formation which are fed into the former where the cardboard sheets are formed into a rectangular tubular shape, designed to be used for such articles as playing cards supported in a tray which slides in the tubular cardboard portion forming the box for the playing cards.

It is a feature to provide a machine which automatically wraps the paper around the rectangular form to a covering which may be of a decorative nature such as bronze or aluminum foil paper. The covering may be of any character and may be in the form of a printed sheet of paper or colored paper.

It is also a feature to provide a cardboard tube former wherein a tucking means is provided which is adapted to tuck in the ends of the sheet being wrapped around the rectangular tubular box portion which has been formed in the machine and around which the covering is wrapped, so that the covering may be extended around the rectangular cardboard tube and automatically tucked in at the ends to cover the entire outside of the rectangular cardboard tube, as well as the ends, and a marginal portion at the inner surface of the ends.

A further feature resides in providing a cardboard tube former and wrapper which operates automatically to form the cardboard tube, then wapping it with a covering or decorative sheet, the ends of which are tucked in and secured to the tubular box portion, then automatically applying a narrower sheet which is wrapped around the outer surface of the first wrapping sheet, leaving a margin of the first wrapping exposed at the ends, and thus permitting a two-toned effect to be secured in making the cardboard tube without having ridges formed in the surface of the narrower sheet as found in construction where the underneath covering sheet, shows as the marginal portion, is made up of a strip on each end of the box. In this manner, the covering may be of gold or silver finished paper or any other colored paper with the decorative finish thereon, while the narrower wrapping of paper may be of any color which will contrast with the first wrapping such as a black narrow wrapping, leaving the edges of gold showing, or a blue narrow wrapping, leaving the edges of the silver paper showing.

All of the operations in this cardboard tube former and wrapper are automatic in operation. The cardboard tube former and wrapper is adapted to support a supply of rolls of decorative paper which is to be applied to the cardboard tube when the same is formed on this machine. The cardboard body of the tubular portion of the box is fed into the machine in flat sheets. The decorative sheets are fed into the machine so that the under decorative covering of paper will be first wrapped on to the cardboard tube, after it is formed into the desired shape, and then by feeding any other decorative sheets into the former and wrapper, a second sheet will be wrapped around the surface of the box in even formation so that wrapping of the sheets around the cardboard tube is uniform and accurate to give a uniform appearance to the finished wrapped tube. The finished cardboard tube, with the decorative wrapping extending around the same, is adapted to receive a cardboard tray in which one or more decks of playing cards may be positioned, or when complete, the decorative tubular portion may form the covering for any other box or container for other articles.

A further feature of this cardboard tube former and wrapper resides in the accurate manner in which the cardboard tube is formed so that they are uniform in dimension and shape, and the decorative outer sheets are wrapped uniformly about the same. The operation of the former and wrapper is timed to rapidly operate in the formation of the decorative cardboard tubes. The design of the tube may be governed by the shape of the mandrel around which the cardboard is formed. Further, the decorative covering sheets for the tube formed on this machine are automatically fed from supply rolls, and adhesive is automatically applied to the under surface of these decorative strips so that they may be readily secured to the cardboard tube one upon the other in uniform position.

The tube former is provided with a series of stations, each of which is formed with a mandrel to receive the cardboard sheet and around which the sheet is formed, and these stations are moved intermittently to different positions in the machine with pressure rollers operating to carefully wrap the cardboard around the mandrel and the decorative sheets around the cardboard.

A suitable cutter means is timed to cut off the decorative wrapping sheet while the former continues to operate so that each station is brought into position to receive the wrapping strips and when the outer wrapping strip has been applied around the tube, suitable tucking means comes into operation to tuck in the wrapping sheet which extends beyond the ends of the tube, and thus the wrapping sheet is tucked into the ends of the tube in a neat and uniform manner, all of which operations are automatic and are accomplished more accurately and rapidly than can be done in the ordinary hand covering of tubular box portions.

A feature of this invention resides in the method of automatically forming the skeleton chip or cardboard from a flat sheet into the final formation of a tubular casing portion of a box or container with certain decorative covering over the same which is adapted to give a two-toned effect, or to supply the covering of the tubular member with a decorative finish that is desired. This is carried out by my method in a manner as follows:

1. The flat cardboard sheet is fed into the machine from a hopper having a supply of these sheets.
2. The sheet is scored as desired.
3. The sheet is folded into a U formation.
4. The ends of the sheet are over-lapped and secured together to provide the tubular member, by an adhesive.
5. The first covering sheet is attached to the tubular body opposite the folded over and secured ends and is wrapped completely around the tubular body with a marginal edge projecting beyond the tubular body at either end thereof.
6. The second decorative sheet is applied and is wrapped completely around the first sheet leaving a marginal band which exposes the first covering sheet.
7. The extended ends of the first covering sheet are tucked into the open ends of the tubular body and are glued to the inner surface of the tubular body. Thus, a marginal finished tucked in end is provided at each end of the tubular body which forms a decorative covering for the rough edges of the tubular body.

The method accomplishes automatically what heretofore has been done manually; however, in the manual operation, it was difficult to apply the decorative covering for the tubular cardboard skeleton uniformly over the tubular body and to maintain a uniform marginal exposed surface at either end of the tubular body. Furthermore, the hand operation was slow and undesirable.

These features, together with other details and objects, will be more fully and clearly hereinafter pointed out.

In the drawings forming a part of this specification:

The cardboard tube former and wrapper, together with the method of making the cardboard tubes and wrapping the same with the decorative outer surface, is disclosed step by step in Figures 1 through 7 which diagrammatically illustrate the steps or progress of the method to define the invention in a clear and precise manner.

Figure 8:
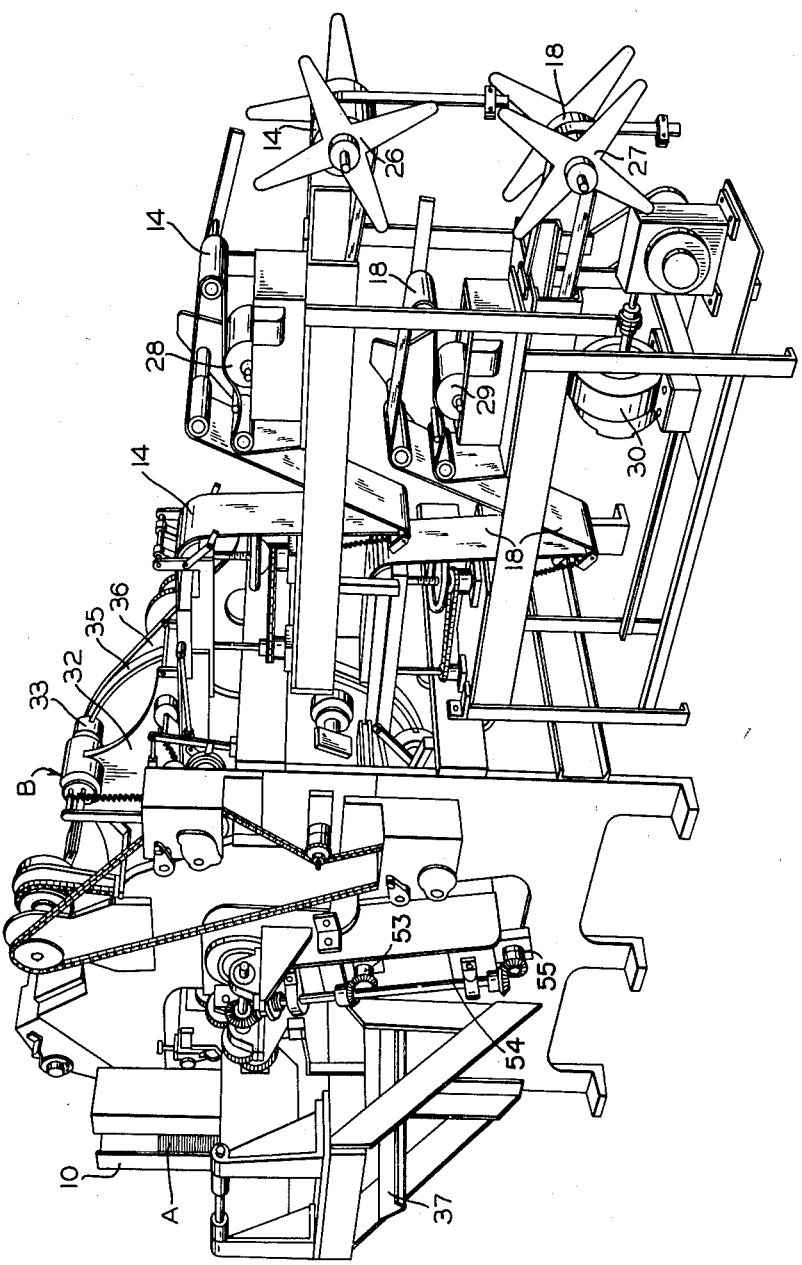
Figure 8 is a perspective view looking at one side of my machine.

The cardboard sheet A may be of any size and may be of a predetermined thickness, with or without a finishing sheet applied to the same when it is made at the factory. If a finishing sheet is applied, this would probably be on the inner surface of the sheet A, owing to the fact that in carrying out this invention, it is desirable to apply a decorative or finished sheet to the outer surface of the cardboard sheet A after it has been formed into a tubular body. The sheets A are adapted to be fed from a supply hopper 10, positioned on the side of the machine B as illustrated in Figure 8.

The first operation in the machine B is to transversely score the sheet A along the lines 11. This scoring may be accomplished in any suitable manner. Adhesive is applied (by means not shown) in an ordinary manner to the flanges 13 during the scoring operation.

Figure 1:
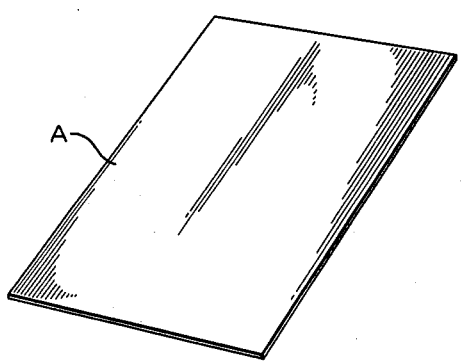
Figure 1 is a diagrammatic illustration showing the flat chip or cardboard sheet used in carrying out my method.
Figure 2:
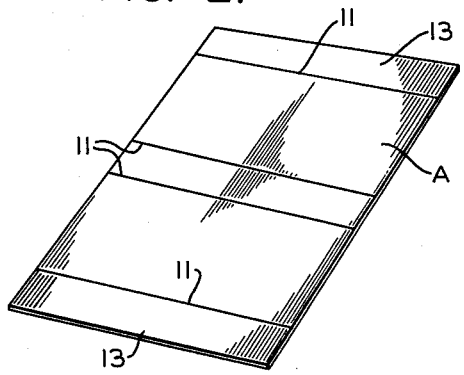
Figure 2 is a diagrammatic illustration showing a perspective view of the sheet scored in the first operation.
Figure 3:
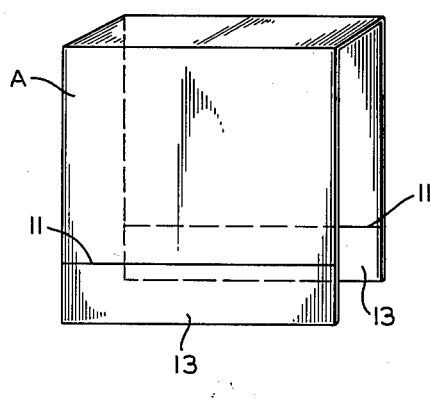
Figure 3 is a diagrammatic illustration showing the sheet bent into a U formation in the third operation.
Figure 10:
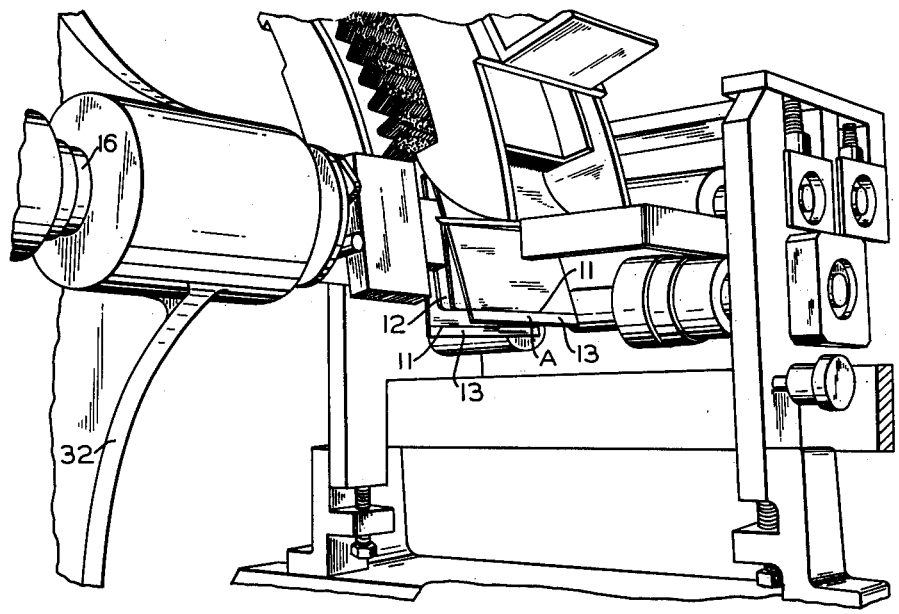
Figure 10 is a perspective detail illustrating the third operation in the folding of the sheet illustrated diagrammatically in Figure 3.
Figure 11:
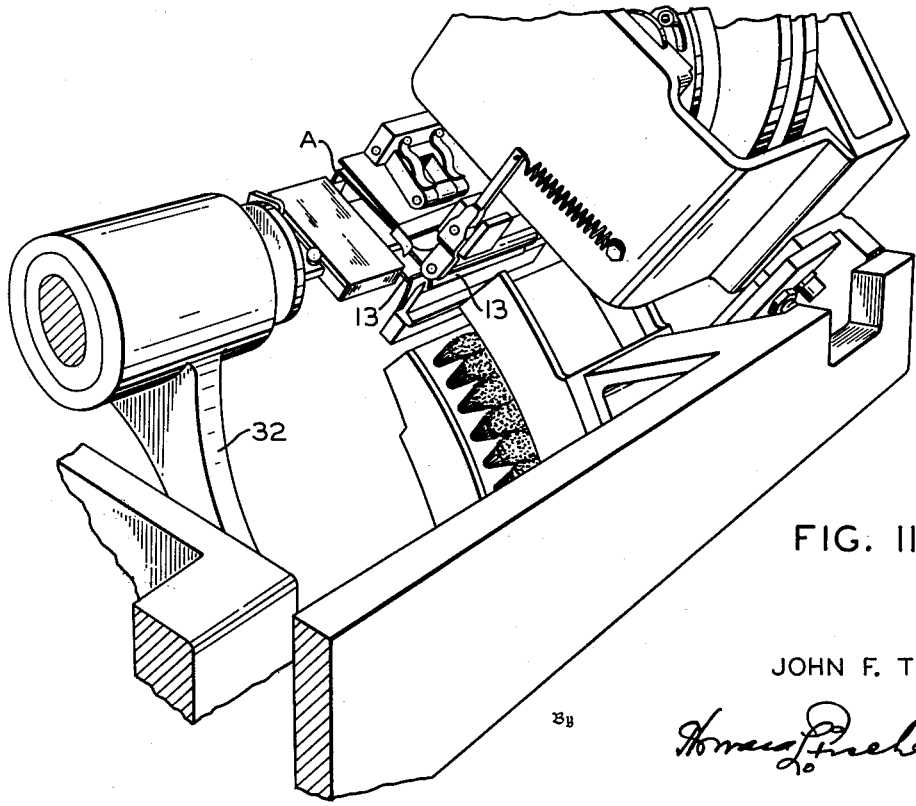
Figure 11 is a perspective view in the continuation of the operation shown in Figure 10 to illustrate the folding of the over-lapping ends of the sheet as shown in the diagrammatic Figure 4.
Figure 12:
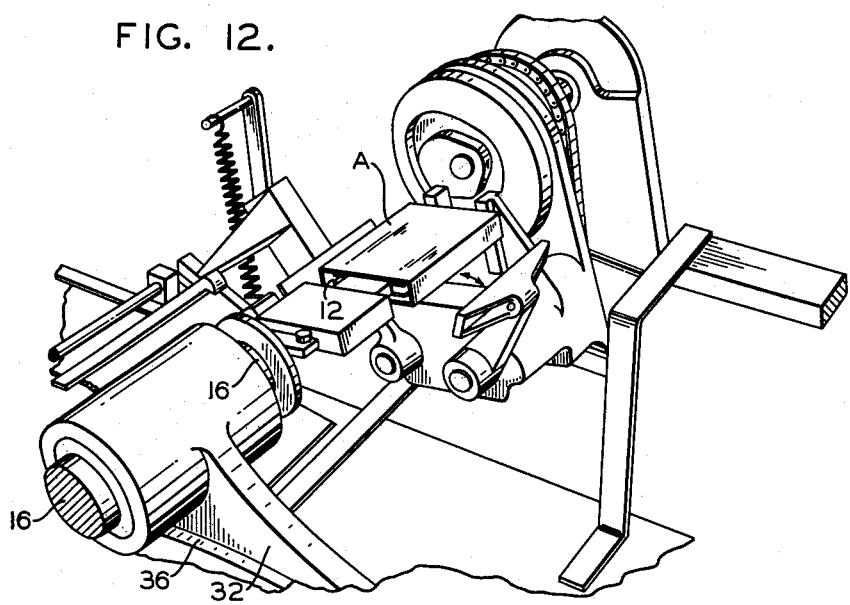
Figure 12 illustrates a perspective view of a portion of my machine showing the clamping jaws in open position, which clamps the tubular body after the operation shown in Figure 11, to cause the over-lap to seal together as illustrated in the diagrammatic Figure 4.

The next step of the method resides in supporting the sheet A on a mandrel 12 and folding the same in U formation, as illustrated in Figures 3 and 10. When the sheet A is in this U formation, the narrow flanges 13 which form one side of the finished tubular body, are in a position to be folded over onto each other and adhered to each other so as to form a tubular body, as illustrated diagrammatically in Figure 4, and the folding operation being illustrated in Figure 11. This constitutes the next step in the method of making the sheet A into a tubular form.

Figure 4:
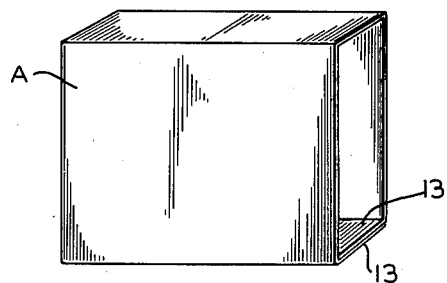
Figure 4 is a diagrammatic illustration showing the folded sheet with the ends over-lapped to provide a complete tubular body or skeleton box portion.

It will be apparent that while I have illustrated the sheet A, formed into a rectangular tubular body, as illustrated diagrammatically in Figure 4, that the tubular body may be of any formation desired and which may be a predetermined factor in making the same.

Figure 5:
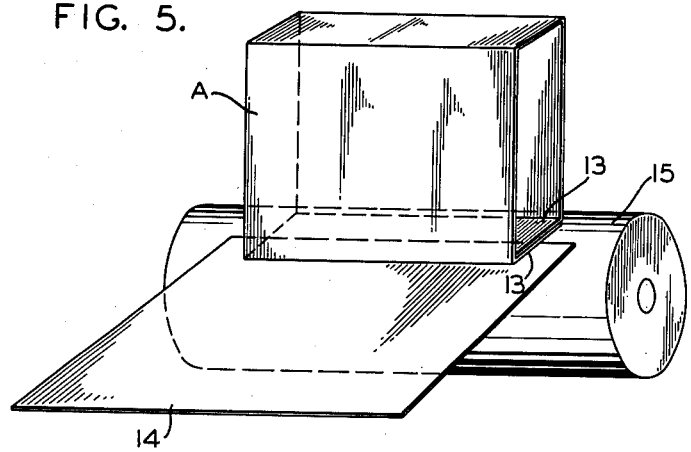
Figure 5 is a diagrammatic illustration showing the next step in carrying out the method of starting the wrapping of the outer decorative sheet around the tubular body.
Figure 14:
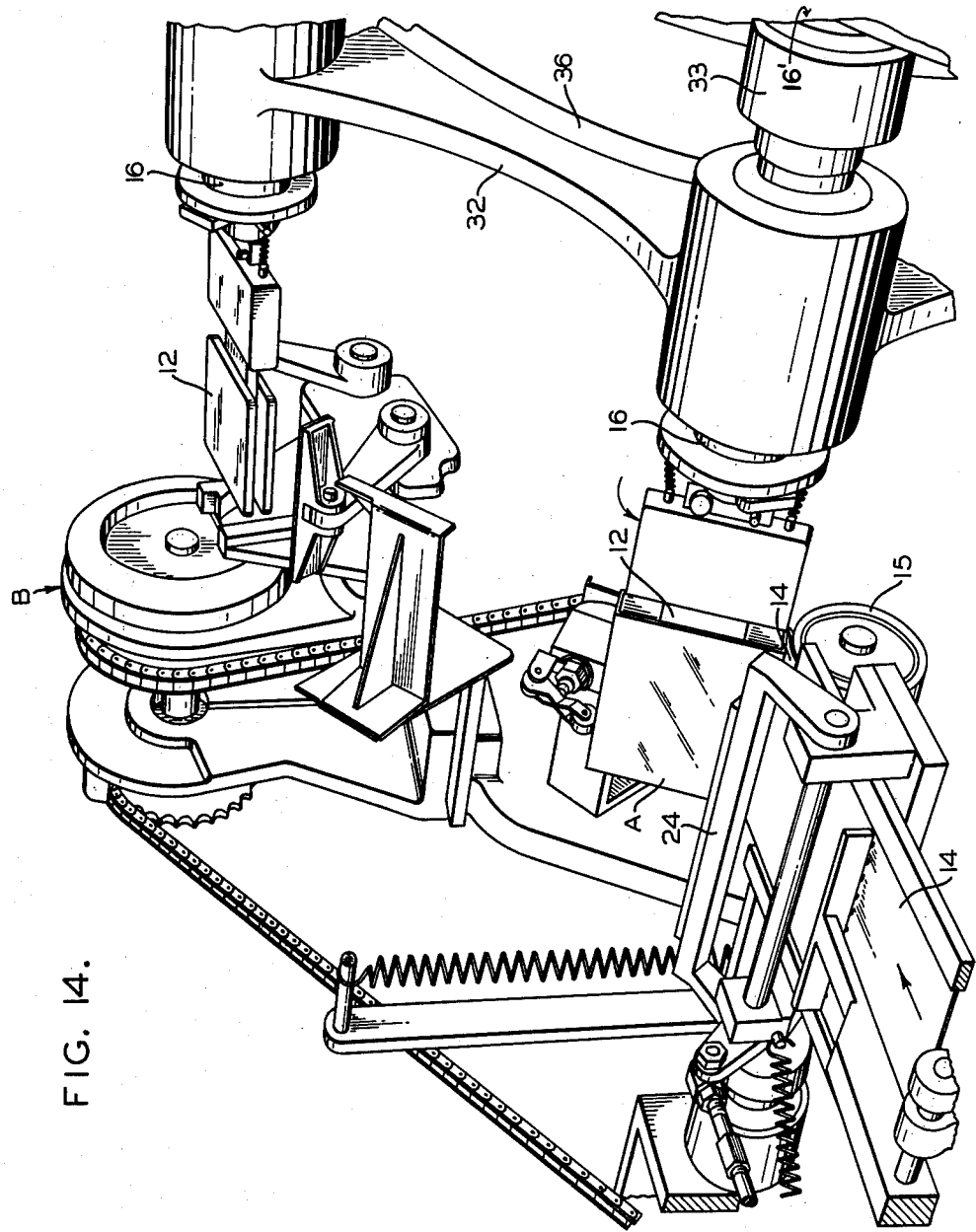
Figure 14 is a perspective view of a portion of my machine illustrating the starting of the wrapping of the covering sheet over the tubular body, and also showing the cut-off knife for the covering sheet in raised position, as exemplified by the diagrammatic Figure 5 which illustrates this step of my method in the starting of the wrapping of the tubular body.
Figure 18:
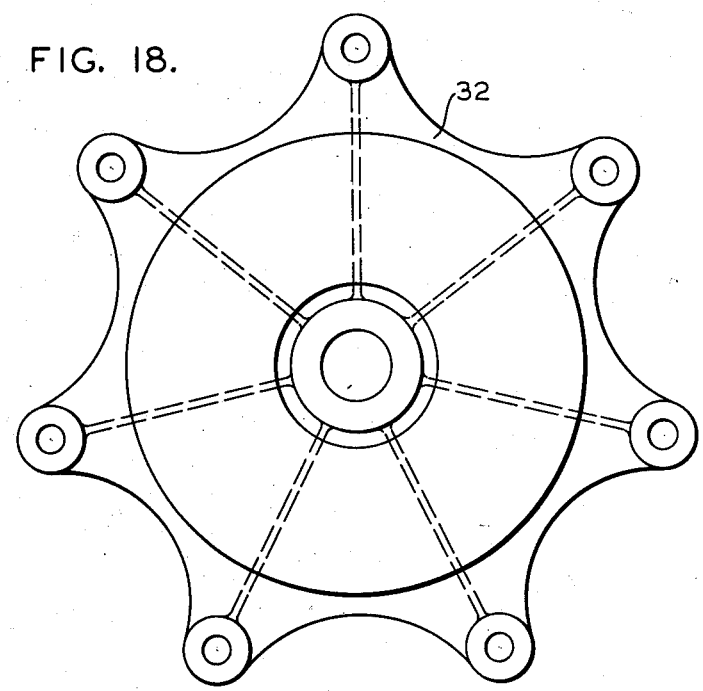
Figure 18 is a side view of the spider wheel which provides the bearings for the shafts of the respective stations and which shafts carry the heads on which the tubular body is formed and wrapped with the decorative covering.

The next step in carrying out my method of making a cardboard tube and wrapping a decorative or colored sheet about the same, resides in applying the outer decorative or colored sheet 14, as diagrammatically illustrated in Figure 5 and also illustrated in the operation of the machine B in Figure 14, where the sheet 14 is shown being fed and applied to the edge of the tubular body A by the machine B. Adhesive having been already applied to the upper surface of the sheet 14, and it being apparent that the under surface of the sheet 14 in the position of the same illustrated in Figures 5 and 14 is of a decorative character, such as enameled colored paper, silver paper, gold paper, or any other colored paper, the soft roller 15 presses the paper 14 against the outer surface of the tubular body A and thus causes the paper to adhere to the same while the mandrel 12 is rotated by the shaft 16 by a suitable mechanism which will be hereinafter set forth.

Figure 21:
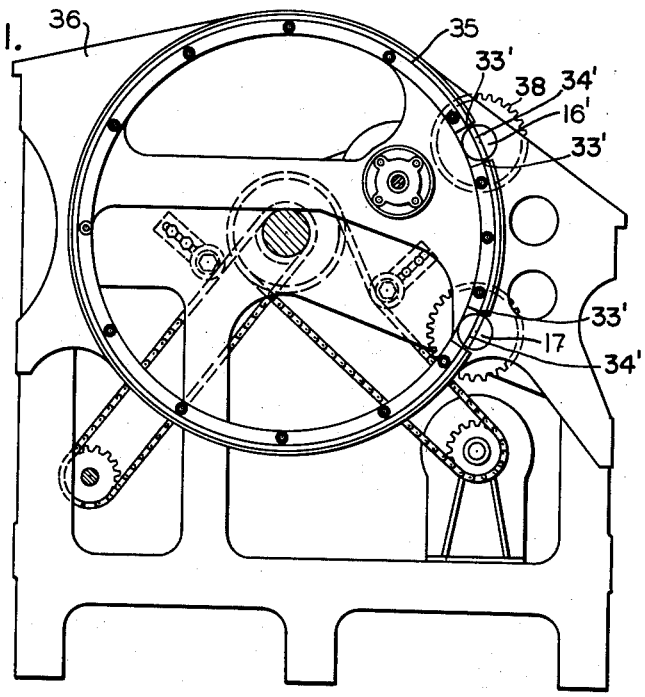
Figure 21 is a diagrammatic view looking from the inside of the machine toward the circular guide track, also showing the stations at which the mandrel shaft is rotated.

Directly after the tubular body A is wrapped with the sheet 14 about the same, the mandrel carrying the body A is moved to the next station which is below the station 16' and is diagrammatically illustrated as the station 17 in Figure 21. At this station 17, the shaft carrying the mandrel 12 is again rotated and the over-wrapping 18 is applied in the process of carrying out my method, as shown in the diagrammatic illustration Figure 6. The sheet 18 is covered on its under side with an adhesive so that it will be readily adhered to the outside of the sheet 14 and a similar roller 15 presses the sheet 18 against the surface of the sheet 14 to adhere the same thereto. The sheet 18 is narrower than the sheet 14 so that when it is wrapped about the tubular body A, a decorative margin 19 is provided at either end of the body A.

Figure 19:
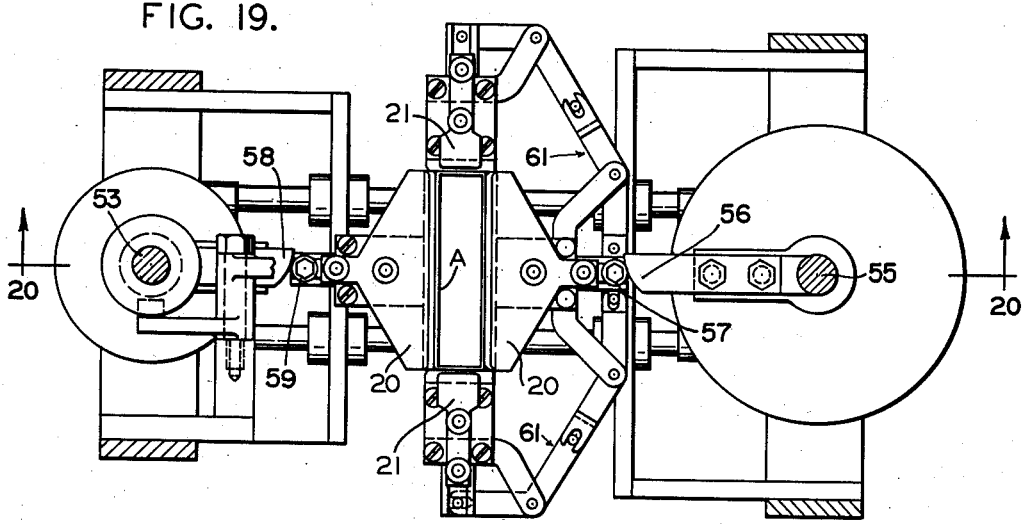
Figure 19 is a diagrammatic illustration of the tucking plates and operating parts.
Figure 20:
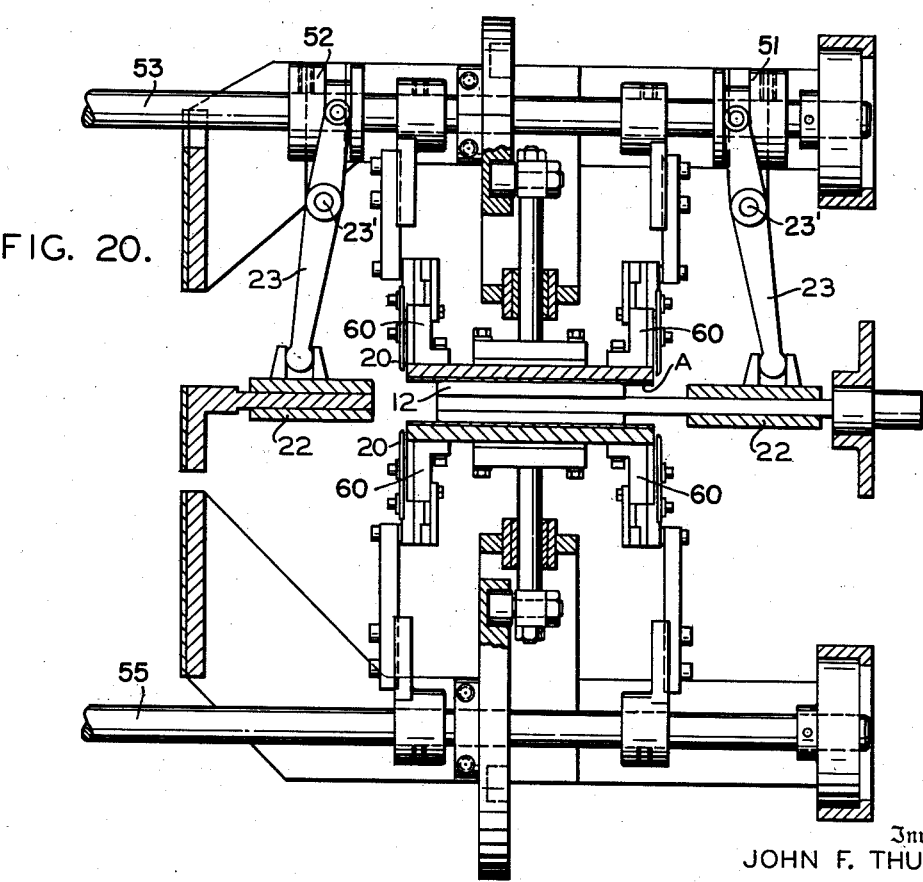
Figure 20 is a diagrammatic section substantially on the line 20—20 of Figure 19.

The mandrel is then carried to the next station, at which point the tucking takes place which is accomplished by the tucking mechanism shown by Figures 19 and 20. The tucked in edges 19' are shown in Figure 7.

Figure 7:
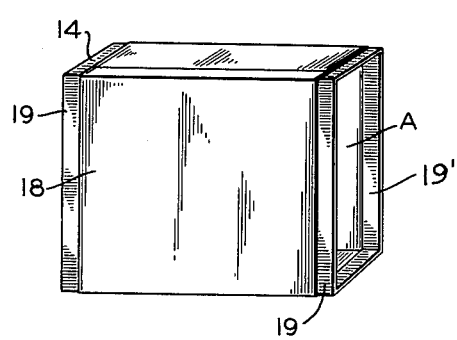
Figure 7 is a diagrammatic illustration showing the final step of my method where the outer decorative sheet is ready for tucking in at the ends of the tubular body and the central second outer decorative sheet has been completely wrapped about the tubular body leaving marginal decorative exposed ends.

In Figure 19, the side blades 20 place the extending ends of the sheet 14 over the opening of the tubular body A, while the end blades 21 place the ends of the sheet 14 in over the ends of the tubular body A, and then the plunger members 22 slide inwardly by the operation of the levers 23 to tuck in the free ends of the sheet 14 over the ends of the tubular body A giving the finished tubular body A as illustrated diagrammatically in Figure 7.

The levers 23 which operate the plunger members 22 are pivoted on the pin shafts 23' and are actuated by the cam members 51 and 52 secured to the shaft 53. The shaft 53 is driven by the shaft 54. The shaft 54 also drives the lower shaft 55 which in turn operates the lower blade 20 by means of the cam arm 56 secured to the shaft 55. The cam arm 56 in its rotating movement contacts the circular member 57 thereby moving the lower blade 20 inwardly toward the body A slightly to place the covering 14 against the end edges of the body A. The cam arm 58 is secured to the shaft 53 and moved thereby to intermittently move the upper blade 20 to further place the sheet 14 against the end edges of the body A for tucking by the mandrel 22. The blades 20 are returned to the positions shown in Figures 19 and 20 by means of a spring (not shown in the drawings) positioned within the small housing 60. The end of the cam arm 58 strikes the circular member 59 thereby moving the plate 20 slightly towards the body A to accomplish the above regarding the sheet 14. The tucker end blades 21 are intermittently moved by the action of the blades 20 through the linkage designated as 61.

The wrapping of the sheet 18 is done by an identical mechanism and in the same manner as the sheet 14 is wrapped around the tubular body A.

Figure 15:
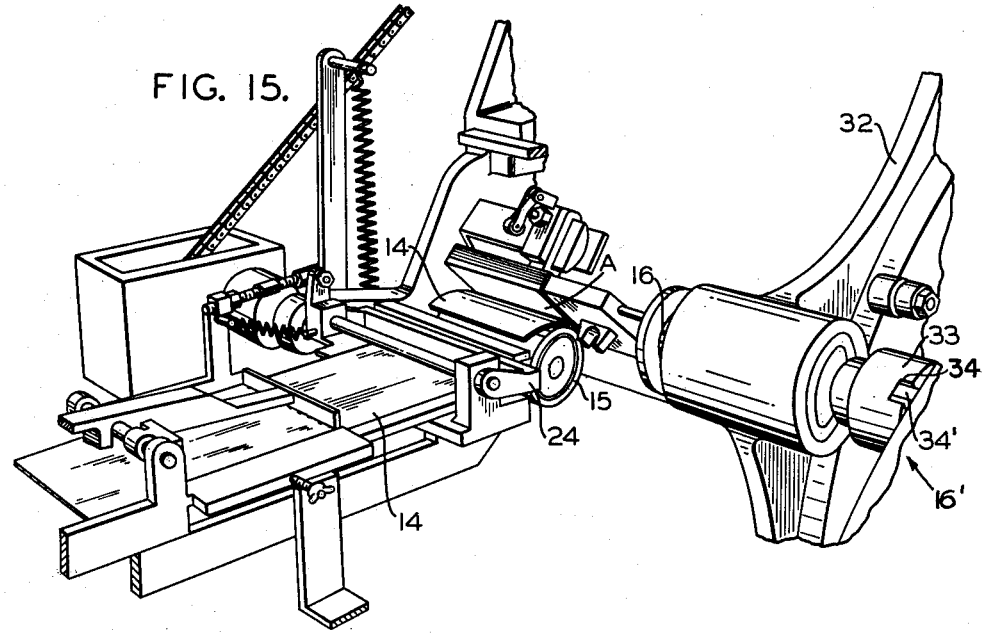
Figure 15 is a perspective view showing a portion of my machine further illustrating the completion of the wrapping of the covering sheet and showing the cut-off knife in lowered position cutting off the covering sheet. This figure shows my machine in operation just prior to the complete wrapping of the first covering sheet, as exemplified in the diagrammatic Figure 6.
Figure 13:
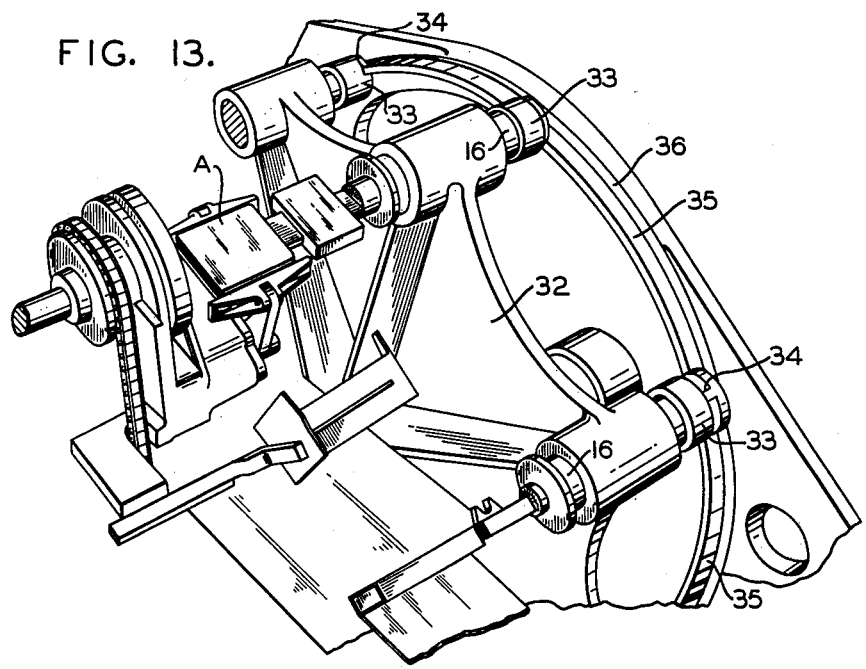
Figure 13 is a perspective view showing the jaws in clamping position which completes the formation of the tubular body.
Figure 16:
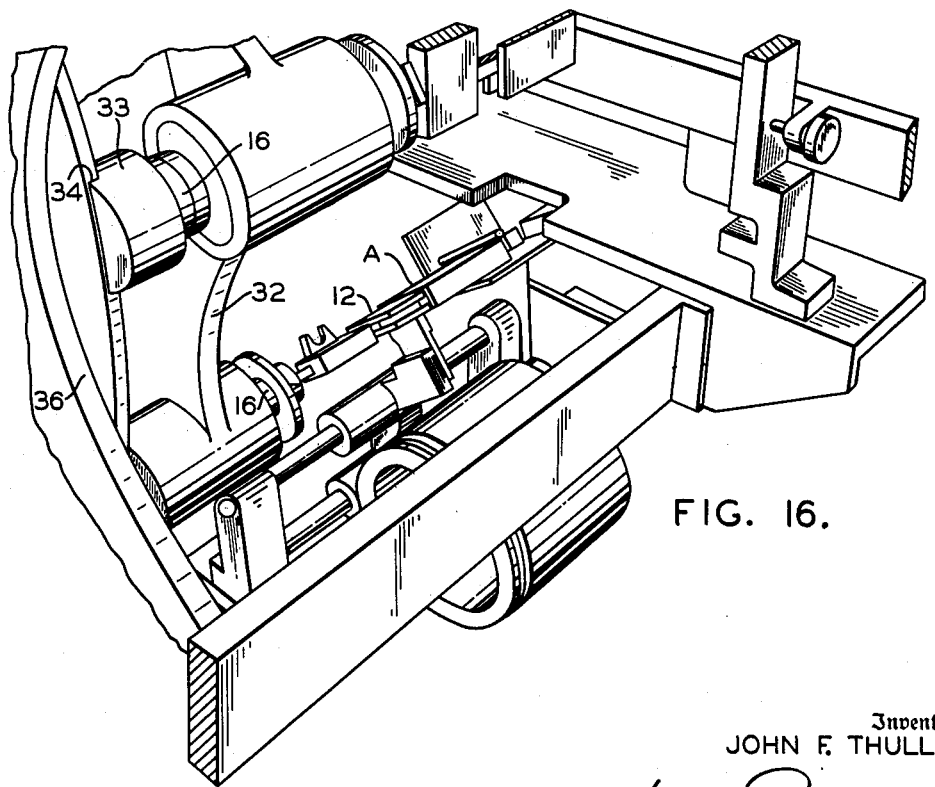
Figure 16 illustrates the final station operation which ejects the finished wrapped tubular body from the machine when the tubular body is wrapped, as exemplified in diagrammatic Figure 7 with a decorative surface over the body and the ends of the decorative sheet tucked in to finish off the ends of the tubular body.

An automatic cutter 24 is provided for cutting off the sheet 14 and the same type of cutter is used for cutting off the sheet 18 in the wrapping process around the tubular body A. The cutter 24 is shown in Figure 14 out of operation and in Figure 15 the cutter 24 is shown in cutting off position with the end of the sheet 14 in the process of being wrapped around the tubular body A as the shaft 16 rotates and the roller 15 presses the free end of the sheet 14 against the tubular body A.

Thus, it will be apparent that in either the wrapping of the sheet 14 or the sheet 18, the same kind of mechanism is used, with one set of mechanism placed below the other mechanism so that the wider sheet 14 is wrapped around the body A first and the narrower sheet is wrapped around at the next station with virtually identical mechanisms performing these operations.

Figure 9:
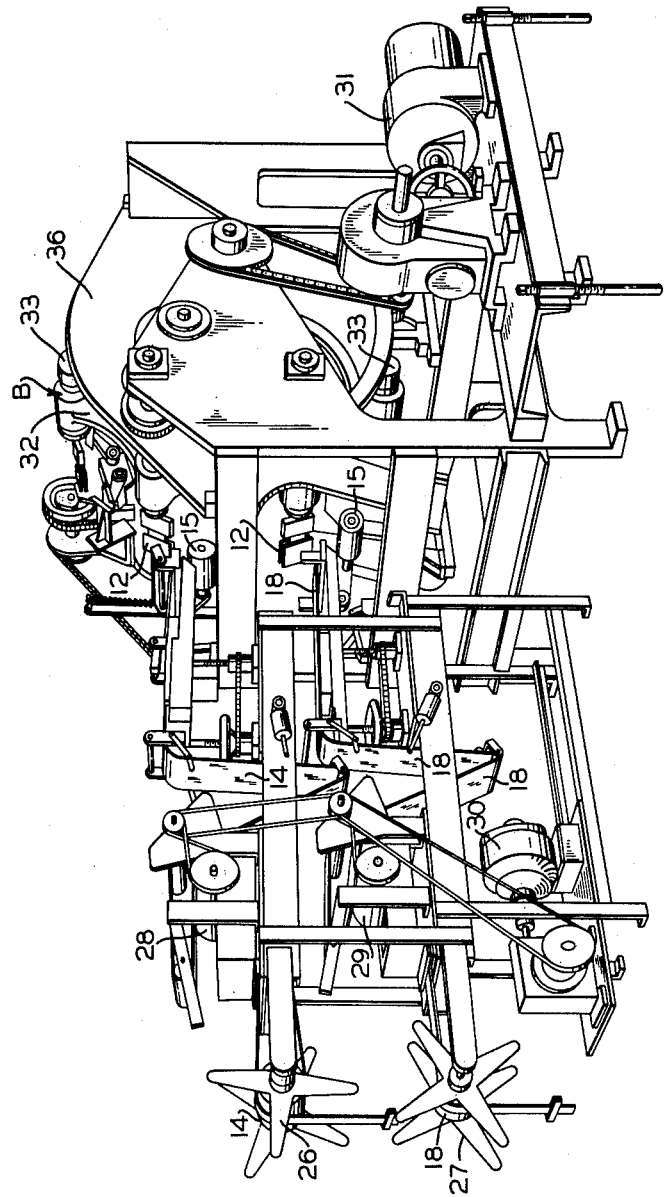
Figure 9 is a perspective view looking at the opposite side of Figure 8.

The machine B is used in carrying out my method and is illustrated in perspective in Figures 8 and 9, one figure showing one side of the machine and the other figure showing the other side of the machine. A supply of the paper sheet 14 is held on spool 26 while a supply of the paper 18 is held on the spool 27. The gluing mechanism 28 applies the glue to the sheet 14 and the gluing mechanism 29 applies the glue to the surface of the sheet 18. The machine B is driven by a suitable source of power; for example, the motor 30 operates the gluing mechanism and the motor 31 operates the spider member 32 which carries the mandrels on the respective shafts 16.

The ends of the shafts 16 carry a head portion 33 which has a keyway 34 extending through the same and which normally engages the circular guide track 35 in the rotation of the spider member 32. The guide track 35 is supported by the end frame member 36 of the machine B which is rigidly and stationarily supported to the main frame of the machine B.

Figure 17:
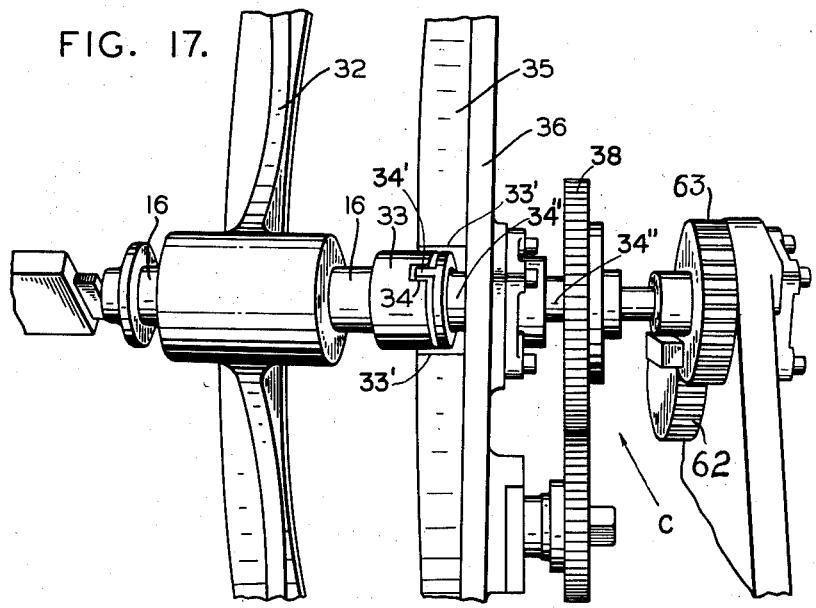
Figure 17 illustrates a portion of my machine showing the clutch mechanism which rotates the ends of the different stations at a predetermined period and illustrates the guide which aligns the clutch slot up to the respective station where it is rotated by the clutch dog.
Figure 22:
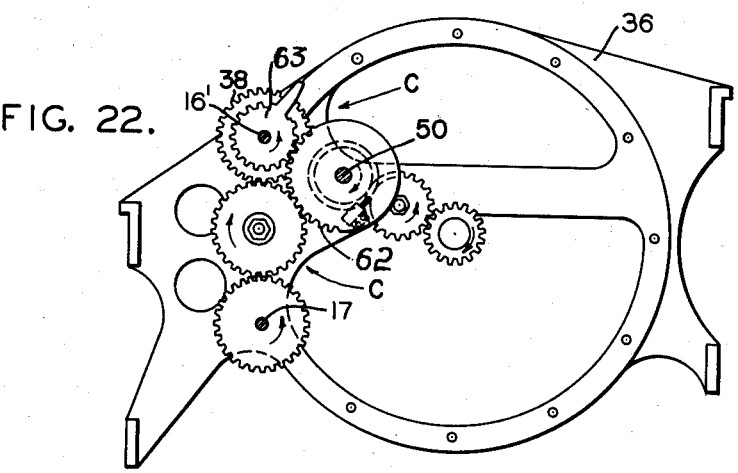
Figure 22 is a diagrammatic view similar to Figure 21 looking in the opposite direction and diagrammatically showing the driving gears which operate the shafts supporting the mandrel when they reach the stations designated for rotation.

The keyway 34 of the head portion 33 is in engagement with the track 35 as the spider member 32 rotates. The head portion 33 is positioned between the end shoulder portions 33' which define a break or opening in the track 35. As the head portion 33 comes to the station and shaft 16', as illustrated particularly in Figure 21, the keyway 34 is engaged by the key 34', and the head portion 33 is rotated, thereby rotating the mandrel 12. The key 34' is rotated by means of the shaft 34" which in turn is rotated by means of the gear 38 of the gear train C, illustrated particularly in Figures 21 and 22 and partially in Figure 17. The partial gear 62 of the gear train C drives the shafts 16' and 17 intermittently when the head portions 33 are opposite thereto. At station 16' the wider sheet 14 is wrapped around the body A while at station 17 the sheet 18 is applied.

The spider member 32 is rotated and intermittently stopped at the stations described herein by means of a 7 position Geneva wheel movement well known in the machine art. The star wheel of the Geneva movement is mounted directly on the spider wheel 32, the star wheel being actuated by a crank arm driven by the shaft 50 illustrated in Figure 22.

After the completion of the method of wrapping the tubular body A, as hereinbefore described, the finished product illustrated diagrammatically in Figure 7 is automatically ejected from the machine B out of the trough 37.

Figure 6:
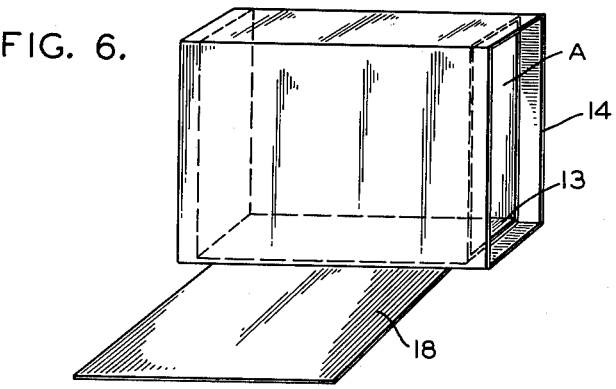
Figure 6 is a diagrammatic illustration showing the next step in the method where the outer decorative sheet has been wrapped around the tubular body and the second decorative sheet is started in its wrapping operation around the first decorative sheet.

The machine B is equipped with safety controls, not illustrated in the drawings, which will automatically stop the machine if any of the stations fail to operate as designated and to intermittently operate the rotation of the spider member 32 so as to carry the tubular body A through the machine to a completion in the wrapping of the decorative sheets 14 and 18 around the same. For instance, the rotation of the spider member 32 stops during the rotation of the mandrel to wrap the respective sheets 14 and 18 around the tubular body A. When this step of the method has been completed, the rotation of the spider member 32 is again effected, with the heads 33 riding on the circular guide track 35 to complete the cycle of operation in carrying out the method of automatically wrapping the decorative sheets 14 and 18 around the tubular body A after it has been formed, as defined in Figures 1 to 4 inclusive. From this step of the method, to the completion of the same, Figures 5 to 7 illustrate the carrying out of my method.

The machine B is designed to accomplish this method in a step by step process from the start, with a flat cardboard sheet, until the tubular body has been delivered in finished form with one or more decorative sheets wrapped about the body of the same and the ends of the wide sheet tucked in to finish the raw ends of the cardboard tube formed in my machine. In this manner, I accomplish automatically the making of the tubular body A and the decorating of the same without hand operation and with the wrapping in true alignment around the body A which is accomplished economically to produce the finished product which is desirable for playing card boxes and other similar articles, where it is desired to hold similar articles within a container.

I claim:

1. In a rotary device for forming and covering a substantially rectangular shaped tubular shell member, a vertical rotatable spider member, a circular track having openings formed therein, key means rotatably mounted in said openings, means for rotating said spider member, substantially rectangular shaped mandrel means mounted on said spider in a horizontal plane and formed with a keyway in engagement with said track, means for intermittently stopping said spider and said mandrel means at predetermined stations including said openings, said key means adapted to rotate said mandrel means when the same is at said opening station, a hopper for holding a supply of cardboard sheets, means for feeding said sheets to said mandrel means, lever means for forming a cardboard sheet on said mandrel means into tubular form, a supply of base decorative sheet material, means for carrying said base sheet supply to said tubular member, cylinder means adjacent said mandrel means for wrapping and adhering said base decorative sheet about the tubular form with the ends of said base material extending beyond the ends of the tubular form when said mandrel means is rotated by said key means, a supply of a second decorative sheet material of a width less than said base decorative sheet material, means for carrying said second decorative sheet material to the formed tubular member, cylinder means for wrapping said second decorative sheet material over said base sheet material when said mandrel means is rotated by said key means thereby leaving an exposed marginal strip on each end of said base material, and means for tucking the extended ends of said base covering into said tubular form and adhering the same thereto.

2. A device for forming and covering a tubular shell member including a vertical rotatable spider member, means for rotating said spider member intermittently to stop at predetermined positions, mandrel means mounted on said spider member and being formed with a keyway, key means adapted to engage said keyway for rotating said mandrel means, a supply hopper for cardboard sheets from which the tubular shell member is formed, means for scoring and feeding the sheets to said mandrel means, means for forming and securing the cardboard sheets around said mandrel means as said spider rotating means is operated, means for supplying decorative base sheet covering material of a width greater than the tubular member, means for supplying adhesive to the underside of the base covering material, means for supplying the base covering material to the tubular form on said mandrel means when said mandrel is rotated by said key means, a rotatable cylinder mounted adjacent said mandrel means adapted to press the base covering material onto the tubular form with the edges thereof extending beyond the form as said mandrel is rotated by said key means, means for cutting off the base covering material, means for supplying outer decorative sheet material of a width less than said tubular member for the tubular member, means for supplying adhesive to the underside of said outer sheet material, means for supplying said outer covering sheet material to the tubular form on said mandrel means, a rotatable cylinder mounted adjacent said mandrel means adapted to press the outer covering material onto said base covering material as said mandrel is rotated, thereby leaving marginal areas of the base covering exposed, means for cutting off the outer covering, means for tucking into the tubular member the extended edges of the base covering material and means for ejecting the covered finished tubular member from said mandrel means.

3. In an apparatus of the character described, in combination, a former mandrel, rotary means adapted to translate said former intermittently, a circular track having spaced openings formed therein, said former having a head portion formed with a keyway in sliding engagement with said track, and rotatable key means positioned at each of said openings adapted to engage said keyway of said head and rotate said former in one direction between the intervals of translation when said head portion is intermittently positioned at said key means at one of said openings of said circular track.

4. In an apparatus of the character described, in combination, a mandrel on which a box shell is formed, rotary means adapted to translate said mandrel intermittently, a circular track having spaced openings formed therein, said mandrel formed with a head portion having a keyway in sliding engagement with said track, key means positioned at each of said openings adapted to engage said keyway of said head portion and rotate said mandrel between the intervals of translation when said head portion is intermittently positioned at each of said openings of said circular track, means for feeding a flat blank of cardboard to said mandrel, means for forming said blank around said mandrel into tubular form at selected intervals of translation thereof, means for feeding sheet material onto the tubular form at the point where said mandrel is rotated, and means for securing the sheet material onto the form as said mandrel is rotated by said key means.

5. In an apparatus of the character described, in combination, a spider member mounted in a vertical plane, means for rotating said spider member intermittently, rotatable mandrel means mounted on said spider, means for folding a sheet of cardboard around said mandrel into tubular form, a circular track having spaced openings formed therein, said mandrel having a head portion formed with a keyway in sliding engagement with said track, key means positioned at each of said openings adapted to engage said keyway of said head portion and rotate said mandrel when the same is intermittently stopped at said openings of said circular track, means for feeding sheet material onto the tubular form at the point where said mandrel is rotated, and means for securing the sheet material onto the form as said mandrel is rotated by said key means.

6. In a device of the character described, in combination, a spider member, means for intermittent translation of said spider member, one or more mandrels rotatably mounted on said spider members, a keyway formed on a portion of said mandrel, a circular track having spaced apart openings mounted adjacent and concentrically with said spider member on which said keyway is slidably mounted, key means positioned in said track openings adapted to engage said keyway when the same is positioned in said opening during the intervals of translation of said spider member, means for rotating said key means to rotate said mandrels at said track opening positions.

7. In a device of the character described, in combination, a rotary spider member vertically mounted, one or more mandrels rotatably mounted on said spider member, means for rotating said spider member intermittently, said mandrel having a keyway formed thereon, guide means engageable in said mandrel keyway adjacent said spider member and mounted concentrically thereto, key means positioned adjacent said guide means engageable in said mandrel keyway when said mandrel is intermittently stopped at said key means, means for rotating said key means when said keyway is in engagement therewith to intermittently rotate said mandrel.

References Cited in the file of this patent

UNITED STATES PATENTS

| | | |
|---|---|---|
| 1,218,417 | Kusterer et al. | Mar. 6, 1917 |
| 1,244,066 | Milmoe | Oct. 23, 1917 |
| 1,312,570 | Palmer | Aug. 12, 1919 |
| 1,481,347 | Carle | Jan. 22, 1924 |
| 1,635,057 | Piermattei | July 5, 1927 |
| 2,237,828 | Hatch et al. | Apr. 8, 1941 |
| 2,612,084 | Keith | Sept. 30, 1952 |